United States Patent [19]

Shiga et al.

[11] 4,419,597
[45] Dec. 6, 1983

[54] ALTERNATOR ASSEMBLY HAVING A RECTIFIER DEVICE IN THERMAL CONTACT WITH CASE AND COVER

[75] Inventors: Tsutomu Shiga, Aichi; Takayasu Nimura, Nagoya, both of Japan

[73] Assignee: Nippondenso Co., Ltd., Kariya, Japan

[21] Appl. No.: 258,293

[22] Filed: Apr. 28, 1981

[30] Foreign Application Priority Data

May 9, 1980 [JP] Japan .......................... 55-63349[U]

[51] Int. Cl.³ ............................................. H02K 9/02
[52] U.S. Cl. .................................. 310/68 D; 310/64; 363/145
[58] Field of Search ............... 310/68 D, 68 R, 71, 310/DIG. 6, 64, 65; 363/145

[56] References Cited

U.S. PATENT DOCUMENTS

| | | | |
|---|---|---|---|
| 3,609,428 | 1/1970 | Cotton | 310/232 |
| 3,739,210 | 6/1973 | Bahlinger et al. | 310/68 D |
| 4,065,686 | 12/1977 | Moore | 310/68 D |
| 4,103,193 | 7/1978 | Ito | 310/68 D |
| 4,169,282 | 9/1979 | Allport et al. | 310/68 D |
| 4,189,653 | 2/1980 | Hiratuka et al. | 310/68 D |

FOREIGN PATENT DOCUMENTS 687540 5/1979 U.S.S.R. .............................. 310/68

Primary Examiner—J. D. Miller
Assistant Examiner—D. S. Rebsch
Attorney, Agent, or Firm—Cushman, Darby & Cushman

[57] ABSTRACT

An alternator assembly for an automotive vehicle including a rectifier device composed of a plurality of diodes supported on a negative-side cooling fin of semi-circular arc shape, a plurality of diodes supported on a positive-side cooling fin of semi-circular arc shape, and a terminal board supporting a plurality of terminals connected to the diodes. The rectifier device is assembled and held in a unitary structure by a plurality of metal members, and arranged in a space defined by an end frame and a rear cover of the alternator assembly in such a manner that the metal members are in contact at one end thereof with the rear cover and at the other end thereof with the end frame.

5 Claims, 5 Drawing Figures

ALTERNATOR ASSEMBLY HAVING A RECTIFIER DEVICE IN THERMAL CONTACT WITH CASE AND COVER

BACKGROUND OF THE INVENTION

This invention relates to an alternator assembly for automotive vehicles, and more particularly it is concerned with an improved rectifier device of an alternator of the type described having a novel support structure.

In view of the fact that an alternator assembly for an automotive vehicle is mounted in an engine room of an automotive vehicle during its entire service life, an alternator assembly has been required to be compact in size, light in weight and high in power and efficiency. In recent years an increase in load has made it necessary for an alternator assembly for a vehicle to develop higher power while on the other hand there has been an increasingly large demand for reducing the weight of a vehicle to conserve energy and hence to reduce the weight of an alternator assembly. Meanwhile a reduction in the space in the engine room for mounting an alternator assembly and the high temperature prevailing therein have instigated the need to develop an improved alternator assembly for a vehicle capable of developing higher power than is possible nowadays, with minimized temperature rise, without increasing the size.

To meet the aforesaid requirements, various proposals have hitherto been made for providing improved cooling means as effective means for accomplishing the objects. Particularly attempts have been concentrated on developing better cooling means for a rectifier device of an alternator assembly, because effective cooling of the rectifier device contributes to prolonging the service life of the alternator assembly.

SUMMARY OF THE INVENTION

This invention has as its object the provision of an alternator assembly provided with an improved rectifier device of compact size that can be cooled efficiently to meet the aforesaid requirements.

According to the invention, there is provided an alternator assembly comprising an end frame, a rear cover mounted outside the end frame in spaced-apart relation thereto, and a rectifier device located in a space defined between the end frame and the rear cover, the rectifier device including a negative side fin, a plurality of first diodes supported on the negative-side fin with their positive electrodes being in contact therewith, a positive-side fin, a plurality of second diodes supported on the positive-side fin with their negative electrodes being in contact therewith, a terminal board of insulating material supporting a plurality of terminals connected to the negative electrodes of the first diodes and the positive electrodes of the second diodes, metal members for unitarily securing the negative-side fin, the positive side fin and the terminal board to one another in superposed relation, the metal members being in contact with the negative-side fin but out of contact with the positive-side fin, and an insulating spacer keeping the negative-side fin and the positive-side fin out of contact with each other, the rectifier device being arranged such that the metal members are in contact at one end thereof with the rear cover and at the other end thereof with the end frame.

DESCRIPTION OF THE PREFERRED EMBODIMENT

Figure 1:
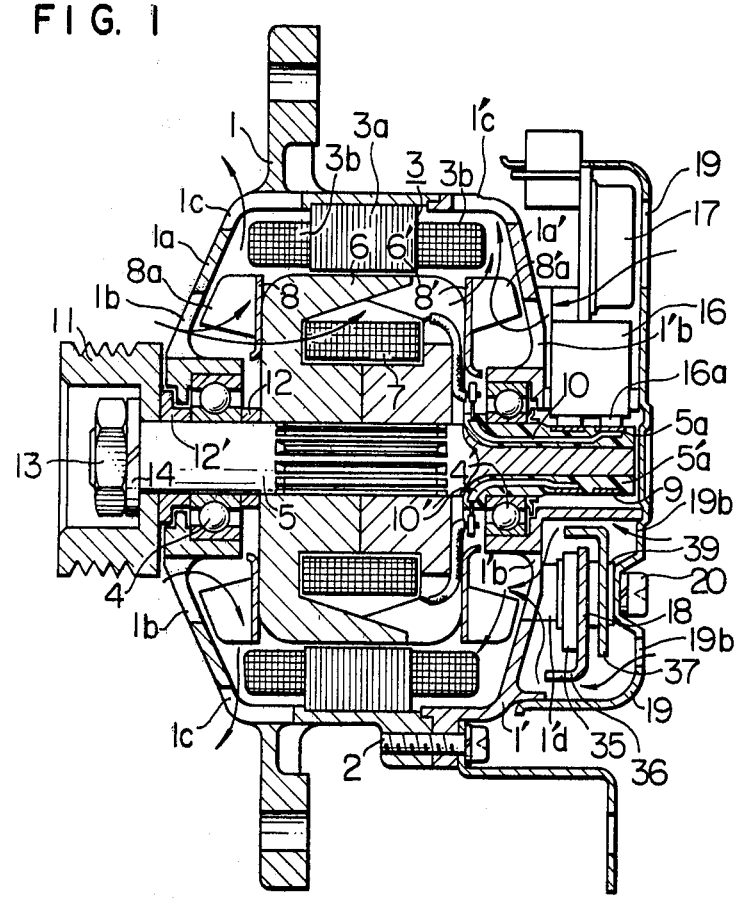
FIG. 1 is a sectional view of the alternator assembly for an automotive vehicle comprising one embodiment of the invention.

FIG. 1 is a sectional view of the alternator assembly for an automotive vehicle comprising one embodiment of the invention comprising a pair of end frames 1 and 1', each end frame including an open-ended cylindrical portion and a conical portion contiguous with the open-ended cylindrical portion, secured to each other by a plurality of bolts 2 at the open ends thereof in contact with each other. A stator 3 including a stator core 3a and a stator coil 3b is secured to the inner surface of the cylindrical portion of the end frame 1 by suitable means, such as force fitting. The conical portions of the end frames 1, 1' are formed at the center with cylindrical bearing boxes projecting toward the center of the alternator assembly for mounting bearings 4 and 4' respectively, which journal a rotary shaft 5 having a pair of pole cores 6 and 6' for supporting a rotor coil 7 on the inner surfaces thereof.

Centrifugal fans 8 and 8' for cooling the interior of the end frames 1, 1' having an outer diameter smaller than the inner diameter of the stator 3 are secured, by suitable means, to the pole cores 6 and 6' respectively on the side surfaces thereof concentrically with the rotary shaft 5 and include blades 8a and 8'a respectively extending in a direction opposite the pole cores 6 and 6' respectively. The blades 8a of the fan 8 are of the same number as the pawls of the pole core 6, and the blades 8'a of the fan 8' may be of any number as desired depending on the volume of fluid desired to be induced to flow. The fan 8 is of the oblique flow type in which the blades 8a are inclined forwardly in the direction of rotation in order to force the cooling fluid to flow into the pole cores 6 and 6' to cool the rotor coil 7. Shrouds 1a and 1'a are formed at the tapering curved surfaces of end frames 1 and 1' respectively and serve as guide plates for the blades 8a and 8'a of the fans 8 and 8' respectively located in suitably spaced-apart relation to the shrouds 1a and 1'a. Apertures 1b and 1'b for inducing fluid to flow therethrough into the end frames 1, 1' from outside upon rotation of the fans 8 and 8' are formed at the tapering curved surfaces of the end frames 1, 1' in the vicinity of the barings 4 and 4' respectively at the center of the conical portions of the end frames 1, 1'. Apertures 1c and 1'c are formed at the tapering curved surfaces of the end frames 1, 1' in positions corresponding to the outer surface of the stator coil 3b, to discharge the fluid therethrough from the interior of the end frames 1, 1' to outside after cooling the alternator assembly.

A slip ring 9 is attached to one end of the rotary shaft 5 outside the end frame 1' and bearing 4' and electrically connected to the rotor coil 7 through connecting wires 10 and 10' fitted in a pair of grooves 5a and 5b on the rotary shaft 5 and held in position by a molding material. The slip ring 9 and connecting wires 10 and 10' are electrically insulated from the rotary shaft 5.

A pulley 11 is secured by a nut 13 and a washer 14 to the other end of the rotary shaft 5 outside the end frame 1 and bearing 4. Collars 12 and 12' are interposed between the pulley 11 and bearing 4 and between the pole core 6 and bearing 4, respectively.

Mounted outside the end frame 1' are a brush holder 16 having a brush 16a, a regulator 17 and a rectifier assembly 18 which are enclosed by a rear cover 19 formed of metal, usually sheet iron.

Figure 2:
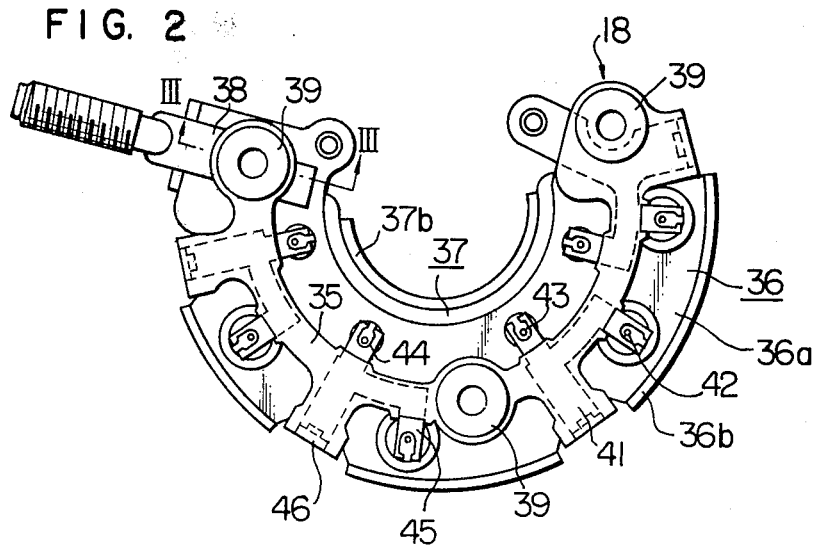
FIG. 2 is a front view of the rectifier device of the alternator assembly shown in FIG. 1, as viewed from the side of the pulley.
Figure 5:
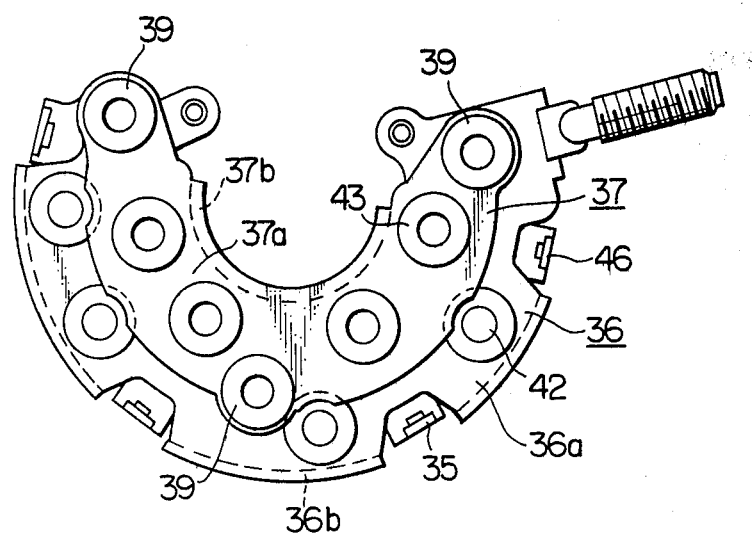
FIG. 5 is a rear view of the rectifier device shown in FIG. 2.

The rectifier 18 includes a terminal board 35 and cooling fins 36 and 37. The cooling fins 36 and 37 are formed of metal and include, as shown in FIGS. 2 and 5, base portions 36a and 37a of substantially horseshoe shape or semi-circular arc shape, and projecting portions 36b and 37b extending from the base portions 36a and 37a at right angles to the inner periphery or outer periphery thereof, respectively. The base portions 36a and 37a have a plurality of diodes (four in number in the embodiment shown) 42 and 43 secured thereto by known means. In the embodiment shown and described herein, the base portions 36a and 37a are each formed with four dents by means of a press, each having one of the diodes 42 and 43 affixed thereto by soldering. One cooling fin 36 is connected to the negative electrodes of the diodes 42, and the other cooling fin 37 is connected to the positive electrodes of the diodes 43, so that the fins 36 and 37 serve as positive-side and negative-side fins respectively. The base portion 37a of the negative-side cooling fin 37 has an area smaller than that of the base portion 36a of the positive-side cooling fin 36.

Figure 3:
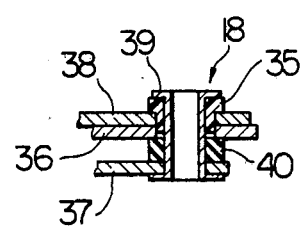
FIG. 3 is a sectional view as seen in the direction of arrows III—III in FIG. 2.
Figure 4:
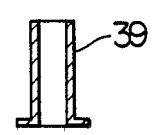
FIG. 4 is a sectional view of the metal member of the rectifier device of the alternator assembly shown in FIG. 1.

The terminal board 35 is formed of a synthetic resinous material having insulating properties and has a plurality of terminals (four in number in the embodiment shown) 41 secured thereto by insert forming. The terminals 41 each includes a first connection 44 projecting inwardly of the terminal board 35 and connected to the negative electrode of the diode 43 supported by the negative-side cooling fin 37, a second connection 45 projecting outwardly of the terminal board 35 and connected to the negative electrode of the diode 42 supported by the positive-side cooling fin 36, and a third connection 46 connected to the stator coil 3b. The cooling fins 36 and 37 and the terminal board 35 are assembled into a unitary structure by superposing one part over another (the cooling fin 37, an insulating spacer 40, cooling fin 36 and terminal board 35 being in the indicated order as shown in FIG. 3) with metal members 39 shown in FIG. 4 being inserted in openings formed in these parts. After the parts are assembled, the metal members 39 are flared at the upper end to provide a unitary structure. In FIG. 3, the numeral 38 designates an output terminal connected to the cooling fin 36. In the embodiment shown and described, three metal members 39 are used for providing the rectifier 18 by assembling the parts in unitary structure. However, the invention is not limited to this specific number of the metal members 39 and any other suitable number of metal members 39 may be used. The diodes 42 and 43 are soldered to the connections 44 and 45 of the terminals 41 of the terminal board 35 after the terminal board 35 is assembled with the cooling fins 36 and 37 by means of the metal members 39.

Referring to FIG. 1 again, the rectifier 18 assembled in a unitary structure as shown in FIG. 3 is forced at the ends of the metal members 39 on the positive-side cooling fin 36 against a hub 1'd of the end frame 1' and at the ends of the metal members 39 on the negative-side cooling fin 37 against the rear cover 19, and the end cover 19 is secured by screws 20 to the end frame 1'. In this way, the rectifier 18 is clamped in place between the end frame 1' and the end plate 19.

In operation, a current is passed through the brush 16a and the slip ring 9 to the rotor coil 7, which is rotated through the pulley 11 and shaft 5 to induce an AC current to be generated in the stator coil 3b and rectified by the rectifier 18. The voltage output is regulated by the regulator 17. This process of operation is known and detailed description thereof will be omitted.

Rotation of the rotary shaft 5 causes the fan 8' on the pole cores 6 and 6' to rotate, to cause current of cold fluid to pass through ventilating apertures 19b formed in the rear cover 19 and cool the rear cover 19 and the cooling fins 36 and 37 of the rectifier 18. The cold fluid further cools the end frame 1' and enters into the end frame 1' through the apertures 1'b to cool the stator coil 3b, to be discharged as a current of hot fluid through the apertures 1'c from the end frame 1'. Owing to the fact that the metal members 39 holding the rectifier 18 as a unitary structure are in contact with the hub 1'd of the end frame 1' and the rear cover 19, the heat generated in the negative-side cooling fin 37 is not only dissipated directly in the current of cold fluid but also given off through the rear cover 19 and the end frame 1' after being transmitted thereto through the metal members 39. Thus the temperature of the rectifier 18 can be greatly lowered.

As aforesaid, heat can be transferred through the metal members 39 from the negative-side cooling fin 37 to the end frame 1' and the rear cover 19 in this embodiment, so that the amount of dissipated heat can be increased. Owing particularly to the arrangement whereby the negative-side cooling fin 37 is located on the side of the rear cover 19 capable of achieving a high heat dissipation effect, the amount of dissipated heat can be increased because the rear cover 19 acts as if it were a part of the cooling fin 37. Also, because of the increased amount of dissipated heat, the cooling fin 37 can have its area reduced to aid in reducing cost. A reduction in the area of the cooling fin 37 enables an increased amount of cooling fluid to be directed to the other cooling fin 36, to thereby increase the effect achieved by the cooling fin 36 in dissipating heat. Also, the arrangement that the rectifier 18 is assembled in a unitary structure by the metal members 39 after placing the cooling fin 37, spacer 40, cooling fin 36 and terminal board 35 one over another in superposed relation and with the diode leads being then soldered thereto, enables the service life of the diodes to be prolonged and permits the performance thereof to be improved because no stress is applied to diode pellets when the rectifier is assembled with the generator.

While a preferred embodiment of the invention has been described using specific terms, such description is for illustrative purposes only, and it is to be understood that changes and variations may be made therein without departing from the spirit or scope of the following claims.

What is claimed is:

1. In an alternator assembly the improvement comprising the combination of:

an end frame;

a rear cover attached to said end frame at the outside thereof in a manner to define a space therebetween; and a rectifier device arranged in said space;

said rectifier device including:

a negative-side cooling fin;

a first group of diodes having their positive electrodes in contact with and supported by said negative-side cooling fin;

a positive-side cooling fin located more remote from said cover than said negative-side cooling fin so as to be upstream of the latter with respect to the cooling air flow thereover;

a second group of diodes having their negative electrodes in contact with and supported by said positive-side cooling fin, said negative-side cooling fin having an area smaller than that of said positive-side cooling fin, whereby said positive-side cooling fin is contacted by a portion of the cooling air which has not first contacted and been warmed by said negative-side cooling fin;

a terminal board formed of an insulating material for supporting a plurality of terminals each connected to one of the negative electrodes of said first group of diodes and to one of the positive electrodes of said second group of diodes;

metal members for securing together in a unitary structure said negative-side cooling fin, said positive-side cooling fin, and said terminal board that are placed one over another in superposed relation, said metal members being maintained in contact with said negative-side cooling fin but out of contact with said positive-side cooling fin; and a spacer formed of an insulating material for keeping said negative-side cooling fin and said positive-side cooling fin out of contact with each other;

said rectifier device being arranged in the space defined by said rear cover and said end frame in such a manner that the metal members are in contact at one end thereof with said rear cover and at the other end thereof with said end frame.

2. An alternator assembly as claimed in claim 1, wherein said rectifier device is arranged in the space in such a manner that one end of the metal members close to said negative-side cooling fin is in contact with said rear cover.

3. An alternator assembly as claimed in claim 1 or 2, wherein said metal members are hollow and a fastener for securing the rear cover to the end frame extends through each said hollow metal member.

4. An alternator assembly as claimed in claim 1 or 2, wherein said positive-side cooling fin and said negative-side cooling fin are of the semi-circular arc shape.

5. An alternator assembly as claimed in claim 4, wherein said metal members are hollow and a fastener for securing the rear cover to the end frame extends through each said hollow metal member.

* * * * *